(12) United States Patent
Oinuma et al.

(10) Patent No.: US 9,868,655 B1
(45) Date of Patent: Jan. 16, 2018

(54) WATER TREATMENT APPARATUS AND WATER TREATMENT METHOD

(71) Applicant: MITSUBISHI ELECTRIC CORPORATION, Chiyoda-ku (JP)

(72) Inventors: Gaku Oinuma, Chiyoda-ku (JP); Masakazu Taki, Chiyoda-ku (JP); Yasutaka Inanaga, Chiyoda-ku (JP); Teruki Naito, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 0 days.

(21) Appl. No.: 15/535,569

(22) PCT Filed: Dec. 18, 2015

(86) PCT No.: PCT/JP2015/085515
§ 371 (c)(1),
(2) Date: Jun. 13, 2017

(87) PCT Pub. No.: WO2016/117260
PCT Pub. Date: Jul. 28, 2016

(30) Foreign Application Priority Data

Jan. 21, 2015 (JP) ................................. 2015-009566

(51) Int. Cl.
*C02F 1/48* (2006.01)
*C02F 9/00* (2006.01)
(Continued)

(52) U.S. Cl.
CPC ................. *C02F 1/48* (2013.01); *C02F 1/44* (2013.01); *C02F 1/78* (2013.01); *C02F 9/00* (2013.01);
(Continued)

(58) Field of Classification Search
CPC ... C02F 1/48; C02F 1/78; C01B 13/11; C01B 2201/14; C01B 2201/22; C01B 2201/76
See application file for complete search history.

(56) References Cited

U.S. PATENT DOCUMENTS 2,615,570 A * 10/1952 Morrison .................. B03C 7/10
209/127.3
6,027,701 A * 2/2000 Ishioka .................... C01B 13/11
204/176

FOREIGN PATENT DOCUMENTS

JP 2001-219170 A 8/2001
JP 2004-66055 A 3/2004
(Continued)

OTHER PUBLICATIONS

International Search Report dated Mar. 8, 2016, in PCT/JP2015/085515, filed Dec. 18, 2015.

*Primary Examiner* — Walter D. Griffin
*Assistant Examiner* — Cameron J Allen
(74) *Attorney, Agent, or Firm* — Oblon, McClelland, Maier & Neustadt, L.L.P.

(57) ABSTRACT

A water treatment apparatus, upper surfaces of two of the consecutively arranged ground electrodes are alternately inclined in opposite directions with respect to a horizontal plane, a gap is formed between a lower surface of an upper side ground electrode and an upper surface of a lower side ground electrode, a voltage is applied to a discharge electrode provided in the gap, thereby forming discharges both in air between the discharge electrode and the lower surface of the upper side ground electrode and in air between the discharge electrode and the upper surface of the lower side ground electrode, and water to be treated is caused to continuously flow downward from the ground electrode of
(Continued)

an uppermost part to the ground electrode of a lowermost part along the respective upper surfaces such that the water to be treated is treated.

14 Claims, 16 Drawing Sheets

(51) Int. Cl.
    *C02F 1/78*         (2006.01)
    *C02F 1/44*         (2006.01)

(52) U.S. Cl.
    CPC ................ *C02F 2201/4616* (2013.01); *C02F 2201/46125* (2013.01); *C02F 2201/782* (2013.01); *C02F 2303/22* (2013.01)

(56) References Cited

FOREIGN PATENT DOCUMENTS

| | | |
|---|---|---|
| JP | 2007-307486 A | 11/2007 |
| JP | 4322728 B2 | 9/2009 |
| JP | 4635204 B2 | 2/2011 |
| JP | 2012-96141 A | 5/2012 |
| WO | 2015/111240 A1 | 7/2015 |
| WO | 2015/111465 A1 | 7/2015 |

* cited by examiner

WATER TREATMENT APPARATUS AND WATER TREATMENT METHOD

TECHNICAL FIELD

The present invention relates to a water treatment apparatus and a water treatment method in which water to be treated is treated using ozone, radicals, and the like generated by a discharge.

BACKGROUND ART

Industrial wastewater and the like can contain persistent substances that cannot be removed by existing ozone treatments. In particular, removal of dioxins, dioxane, and the like is a major problem. In some areas, a method of removing persistent substances by combining ozone ($O_3$) with hydrogen peroxide ($H_2O_2$) or ultraviolet light, thereby causing hydroxyl radicals (OH radicals), which are higher in activity than ozone, to be generated in water to be treated, is in practical use.

However, as equipment and operation costs are very high, this method is not actually very prevalent. In view of this, a method has been proposed in which persistent substances are removed with high efficiency by causing OH radicals and the like generated by a discharge to act directly on water to be treated.

Specifically, such a conventional water treatment apparatus is provided with a layer-structured treatment means respectively including a reaction vessel capable of storing water to be treated in an interior thereof and pin-shaped electrodes that generate a discharge in order to perform discharge radical treatment on the water to be treated, and a power supply means for applying a high voltage to the electrodes. With such a radical treatment system, it is possible to improve efficiency in decomposing persistent substances dissolved in water using radicals (see PTL 1, for example).

Further, a water treatment apparatus has also been proposed in which water to be treated is treated by arranging, in an inclined state, a pair of electrode plates that vertically oppose each other so that water to be treated flows downward onto a lower electrode, and forming a barrier discharge between the electrodes. With such a water treatment apparatus, the water to be treated can be treated efficiently using a simple configuration (see PTL 2, for example).

CITATION LIST

Patent Literature

[PTL 1] Japanese Patent Application Publication No. 2007-307468
[PTL 2] Japanese Patent No. 4635204

SUMMARY OF INVENTION

Technical Problem

However, the following problems exist in the abovementioned prior art. With the conventional water treatment apparatus indicated in PTL 1, formation of a discharge is limited to a narrow region between the pin-shaped electrodes and a water surface of the water to be treated. For this reason, ozone cannot be efficiently generated. In other words, although direct treatment of the water to be treated can be performed using OH radicals or the like, it is not possible to efficiently perform treatment of the water to be treated through a reaction in water that arises due to dissolution of ozone generated by the discharge in the water to be treated. As a result, a problem exists in that water treatment speed is slow.

Further, with the conventional water treatment apparatus indicated in PTL 2, a barrier discharge is formed between the pair of electrodes that oppose each other in the vertical direction as the water to be treated is caused to flow. For this reason, it is not possible to form a discharge over a wide region and, in turn, not possible generate large quantities of oxidizing substances such as ozone, which are effective in decomposing organic matter. As a result, when water treatment is to be implemented at high speed, a reaction vessel needs to be enlarged and a large number of electrodes need to be provided, resulting in an increase in size and an escalation in cost of the apparatus.

The present invention has been made to solve the above-mentioned problems, and an object thereof is to obtain a water treatment apparatus and a water treatment method which, using a comparatively small apparatus, are capable of performing high-speed, efficient decomposition of persistent substances or removal of highly concentrated organic contamination.

Solution to Problem

A water treatment apparatus according to the present invention is provided with a plurality of ground electrodes arranged sequentially in a vertical direction in an interior of a treatment tank, and a plurality of discharge electrodes, each provided in respective gaps formed between a lower surface of the ground electrode on an upper side and an upper surface of the ground electrode on a lower side of two of the ground electrodes arranged consecutively in the vertical direction, wherein the plurality of ground electrodes are arranged such that upper surfaces of two of the ground electrodes arranged consecutively in the vertical direction are alternately inclined in opposite directions with respect to a horizontal plane, a voltage is applied to each of the plurality of discharge electrodes such that a first discharge is formed in air between the lower surface of the ground electrode on the upper side and the discharge electrode, and a second discharge is formed in air between the upper surface of the ground electrode on the lower side and the discharge electrode, and water to be treated that has been supplied from an upper part of the treatment tank is caused to continuously flow downward from the ground electrode of an uppermost part to the ground electrode of a lowermost part along the respective upper surfaces such that the water to be treated is treated.

In addition, a water treatment method according to the present invention is a water treatment method to be applied in a water treatment apparatus provided with: a plurality of ground electrodes arranged sequentially in a vertical direction in an interior of a treatment tank; and a plurality of discharge electrodes, each provided in respective gaps formed between a lower surface of the ground electrode on an upper side and an upper surface of the ground electrode on a lower side of two of the ground electrodes arranged consecutively in the vertical direction, the plurality of ground electrodes being arranged such that upper surfaces of two of the ground electrodes arranged consecutively in the vertical direction are alternately inclined in opposite directions with respect to a horizontal plane, the water treatment method including: a step in which a first discharge is formed in air between the lower surface of the ground electrode on the upper side and the discharge electrode by applying a voltage to each of the plurality of discharge electrodes; a step in which a second discharge is formed in air between the upper surface of the ground electrode on the lower side and the discharge electrode by applying a voltage to each of the plurality of discharge electrodes; and a step in which water to be treated is treated by causing the water to be treated supplied from the upper part of the treatment tank to continuously flow downward from the ground electrode of an uppermost part to the ground electrode of a lowermost part along the respective upper surfaces, and pass through the gaps in which the first discharge and the second discharge are formed.

Advantageous Effects of Invention

In a water treatment apparatus and a water treatment method of the present invention, water to be treated continuously flows downward over upper surfaces of a plurality of ground electrodes arranged sequentially in a vertical direction in an interior of a treatment tank, and discharges are formed respectively between a discharge electrode and a lower surface of an upper side ground electrode and the discharge electrode and an upper surface of a lower side ground electrode. For this reason, a discharge is formed over a wide region in the water treatment tank and a large amount of oxidising substances such as ozone can be generated, allowing a water treatment apparatus and a water treatment method which, using a comparatively small apparatus, are capable of performing high-speed, efficient decomposition of persistent substances or removal of highly concentrated organic contamination, to be obtained.

DESCRIPTION OF EMBODIMENTS

Preferred embodiments of a water treatment apparatus and a water treatment method of the present invention are described below using the drawings.

First Embodiment

Figure 1:
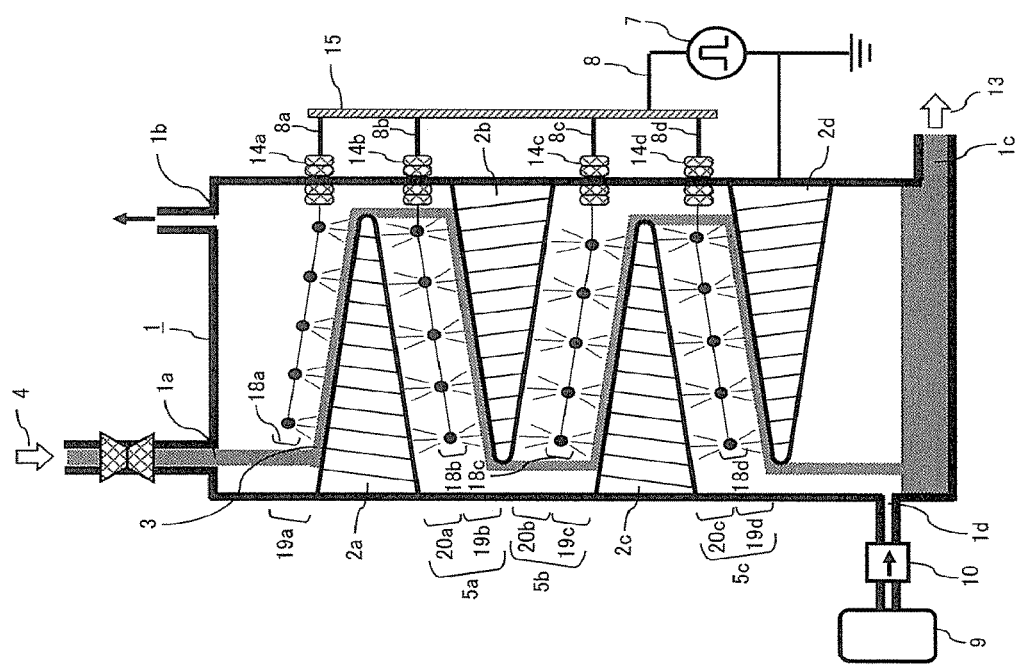
FIG. 1 is a cross-sectional view of a water treatment apparatus according to a first embodiment of the present invention.
Figure 2:
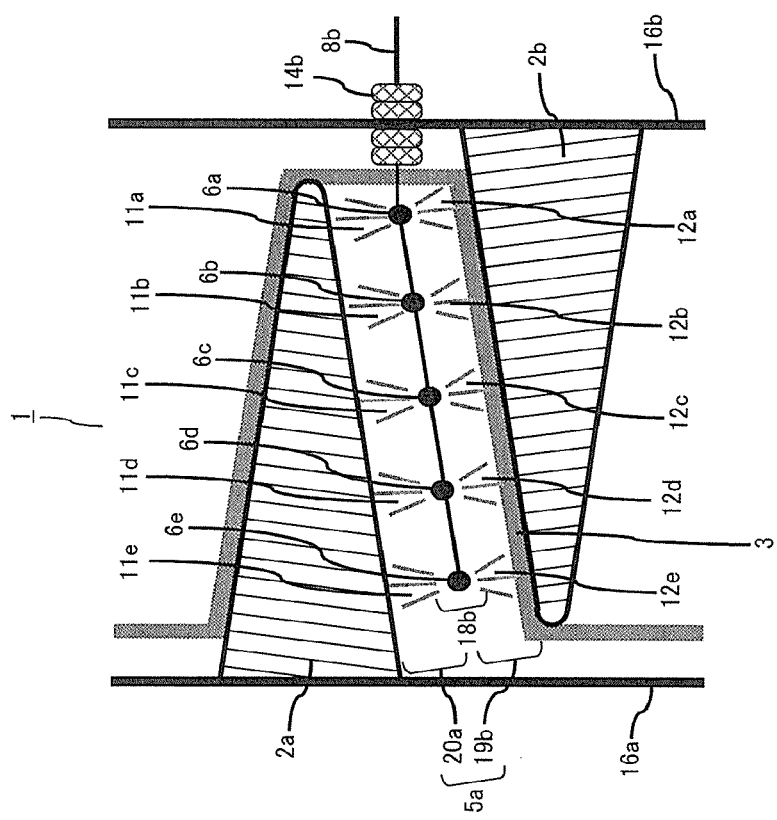
FIG. 2 is an enlarged view of two adjacent ground electrodes and a surrounding area thereof shown in FIG. 1 according the first embodiment of the present invention.

FIG. 1 is a cross-sectional view of a water treatment apparatus according to a first embodiment of the present invention. Further, FIG. 2 is an enlarged view of two adjacent ground electrodes 2a and 2b and a surrounding area thereof shown in FIG. 1 of the first embodiment of the present invention. The water treatment apparatus in the first embodiment is described below in detail using FIG. 1 and FIG. 2.

In FIG. 1, a water supply port 1a and a gas exhaust port 1b are provided at an upper part of a metal treatment tank 1 having a hermetically sealed structure. Meanwhile, a drainage port 1c is provided in a side surface of a lowermost part of the treatment tank 1. Further, a gas supply port 1d is provided on a side surface of the treatment tank 1.

Four metal ground electrodes 2a, 2b, 2c, and 2d are arranged sequentially in an interior of the treatment tank 1 in a plumb direction (a vertical direction). That is to say, the ground electrode 2a is provided at an uppermost location, the ground electrode 2b is provided below the ground electrode 2a, the ground electrode 2c is provided below the ground electrode 2b, and the ground electrode 2d is provided at a lowermost location. The four ground electrodes 2a, 2b, 2c, and 2d are all identical and each has an isosceles triangular column shape. In other words, each of the four ground electrodes 2a, 2b, 2c, and 2d, has a shape in which the isosceles triangular shape shown in FIG. 1 elongates in a depth direction of the page.

Two equal sides (oblique sides) of the isosceles triangular shape of the ground electrodes 2a, 2b, 2c, and 2d are arranged symmetrically with respect to a horizontal plane. In other words, the two oblique sides are inclined in mutually opposing directions with respect to the horizontal plane.

Another side (a base) of the isosceles triangular shape faces the perpendicular direction and is connected to one sidewall of the treatment tank 1. An apex of the isosceles triangular shape (an intersection point of the two oblique sides) is held such that a gap is opened between the apex and the other sidewall of the treatment tank 1. Two of the ground electrodes arranged consecutively are disposed so as to be bilaterally symmetrical with respect to a perpendicular plane and such that a predetermined interval is formed therebetween in the vertical direction.

That is to say, as shown in FIG. 2, a base of the ground electrode 2a is connected to a left sidewall 16a of the treatment tank 1, and a base of the ground electrode 2b is connected to a right sidewall 16b of the treatment tank 1. Similarly therebelow, a base of the ground electrode 2c is connected to the left sidewall 16a of the treatment tank 1 and a base of the ground electrode 2d is connected to the right sidewall 16b of the treatment tank 1.

Hence, a gap 5a having a uniform height is formed between the ground electrodes 2a and 2b, a gap 5b having a uniform height is formed between the ground electrodes 2b and 2c, and a gap 5c having a uniform height is formed between the ground electrodes 2c and 2d. Accordingly, a configuration is such that, as shown in FIG. 1, water to be treated 4 supplied from the water supply port 1a flows downward in a zigzag along respective upper faces of the ground electrodes 2a, 2b, 2c, and 2d.

Discharge electrodes 18a, 18b, 18c, and 18d are formed above each of the ground electrodes 2a, 2b, 2c, and 2d via lower gaps 19a, 19b, 19c, and 19d. In addition, upper gaps 20a, 20b, and 20c are formed respectively between lower surfaces of the ground electrodes 2a, 2b, and 2c and the discharge electrodes 18b, 18c, and 18d. The lower gaps 19a, 19b, 19c, and 19d and the upper gaps 20a, 20b, and 20c are formed so as to have respectively uniform heights.

That is to say, all of the discharge electrodes 18a, 18b, 18c, and 18d are held in the air so as not to be in contact with the ground electrodes 2a, 2b, 2c, and 2d. Further, the gap 5a is formed by the upper gap 20a and the lower gap 19b, a gap 5b is formed by the upper gap 20b and the lower gap 19c, and a gap 5c is formed by the upper gap 20c and the lower gap 19d.

Next, a specific configuration of the discharge electrodes 18a, 18b, 18c, and 18d will be described on the basis of FIG. 2 using the discharge electrode 18b as an example. In FIG. 2, the discharge electrode 18b is constituted by a plurality (five in FIG. 2) of wire electrodes 6a, 6b, 6c, 6d, and 6e. The wire electrodes 6a, 6b, 6c, 6d, and 6e are arranged at intervals to each other in a left-right direction of FIG. 2. Further, the wire electrodes 6a, 6b, 6c, 6d, and 6e are parallel to and horizontally stretched along a width direction of the ground electrodes 2a and 2b (a depth direction of the page on which FIG. 2 is depicted).

Further, all of the wire electrodes 6a, 6b, 6c, 6d, and 6e are connected to a wire 8b. A current introduction terminal 14b is provided on the right sidewall 16b of the treatment tank 1 and the wire 8b passes through the right sidewall 16b via the current introduction terminal 14b. Here, the wire 8b and the treatment tank 1 are electrically insulated from each other by the current introduction terminal 14b.

In the same way as the discharge electrode 18b, the discharge electrodes 18a, 18c, and 18d in FIG. 1 are also respectively constituted by the wire electrodes 6a, 6b, 6c, 6d, and 6e, are respectively connected to wires 8a, 8c, and 8d and, via respective current introduction terminals 14a, 14c, and 14d, communicate with an exterior of the treatment tank 1.

An output of a high voltage side of a pulse power supply 7 provided on the exterior of the treatment tank 1 is connected to a wire 8. Meanwhile, an output of a ground side of the pulse power supply 7 is connected to the treatment tank 1 and electrically grounded.

The ground electrodes 2a, 2b, 2c, and 2d are electrically connected to the treatment tank 1, and all reflect ground potential. The wire 8 is connected to a bus bar 15, and the wires 8a, 8b, 8c, and 8d are connected to the bus bar 15. Hence, the discharge electrodes 18a, 18b, 18c, and 18d are electrically connected in parallel to the pulse power supply 7.

A gas supply source 9 filled with oxygen gas is connected to the gas supply port 1d via a flow rate regulator 10.

Next, operations of the water treatment apparatus in the first embodiment will be described. Oxygen gas from the gas supply source 9 is adjusted to a predetermined flow rate by the flow rate regulator 10 and then supplied into the treatment tank 1 from the gas supply port 1d.

Meanwhile, gas in the treatment tank 1 is exhausted from the gas exhaust port 1b at a flow rate identical to the supplied oxygen gas flow rate. Hence, after a predetermined time period has elapsed, air is exhausted from the treatment tank 1 and an atmosphere having a high oxygen concentration is formed in the treatment tank 1.

The water to be treated 4 supplied into the treatment tank 1 from the water supply port 1a flows downward while forming a water film 3 on an upper surface of the ground electrode 2a, and flows from a furthest downstream portion (a right end portion in FIG. 1) thereof onto an upper surface of the ground electrode 2b. In the same way therebelow, the water to be treated 4 flows downward onto respective upper surfaces of the ground electrode 2b, the ground electrode 2c, and the ground electrode 2d in this order, finally falls into a bottom portion of the treatment tank 1, and, as treated water 13, is drained from the drainage port 1c. At this time, a portion of the water to be treated 4 is volatized as water vapour, such that an atmosphere having a high oxygen concentration and including water vapour is formed in the interior of the treatment tank 1.

Here, the water film 3 and the discharge electrodes 18a, 18b, 18c, and 18d are not in contact with each other. That is to say, a thickness of the water film 3 is adjusted so that a gas layer is formed between the discharge electrodes 18a, 18b, 18c, and 18d and the water film 3. The thickness of the water film is adjusted by a flow rate of the shared water to be treated 4, an inclination angle with respect to the horizontal plane of the upper surfaces of the ground electrodes 2a, 2b, 2c, and 2d, or a surface roughness of the upper surfaces of the ground electrodes 2a, 2b, 2c, and 2d.

Next, a pulse voltage is applied to the discharge electrodes 18a, 18b, 18c, and 18d by operating the pulse power supply 7. As a result, lower discharges 12a, 12b, 12c, 12d, and 12e, that is, secondary discharges, are formed from the wire electrodes 6a, 6b, 6c, 6d, and 6e of the discharge electrodes 18a, 18b, 18c, and 18d toward the upper surfaces of the ground electrodes 2a, 2b, 2c, and 2d, as shown in FIG. 2.

At the same time, upper discharges 11a, 11b, 11c, 11d, and 11e, that is, primary discharges are formed from the wire electrodes 6a, 6b, 6c, 6d, and 6e of the discharge electrodes 18b, 18c, and 18d toward the lower surfaces of the ground electrodes 2a, 2b, and 2c.

In the process of flowing along the upper surfaces of the ground electrodes 2a, 2b, 2c, and 2d, the water to be treated 4 touches, in order, each of the lower discharges 12a, 12b, 12c, 12d, and 12e, whereby water treatment such as removal of persistent substances is performed.

Further, the water treatment such as removal of persistent substances is performed through a reaction in water by dissolution in the water to be treated 4 of ozone and hydrogen peroxide generated by the respective upper discharges 11a, 11b, 11c, 11d, and 11e.

Next, a principle of performing treatment of the water to be treated 4 using the water treatment apparatus indicated in the first embodiment will be described. Note that, here, although description will be given using decomposition of organic matter as an example, it is a well-known fact that $O_3$ and OH radicals generated by a discharge are also effective for removal of bacteria, decoloration, and deodorization.

The upper discharges 11a, 11b, 11c, 11d, and 11e and the lower discharges 12a, 12b, 12c, 12d, and 12e are formed by applying a pulse voltage to the discharge electrodes 18a, 18b, 18c, and 18d. At this time, oxygen molecules ($O_2$) and water molecules ($H_2O$) in the treatment tank 1 collide with high-energy electrons, and dissociation reactions shown by the following formulas (1) and (2) occur. Note that, in the formulas (1) and (2), e is an electron, O is atomic oxygen, H is atomic hydrogen, and OH is an OH radical.

$$e + O_2 \rightarrow 2O \tag{1}$$

$$e + H_2O \rightarrow H + OH \tag{2}$$

Much of the atomic oxygen generated in the above formula (1) becomes ozone ($O_3$) due to the reaction of the following formula (3). Note that, in the following formula (3), M is a third body of the reaction and represents any molecule or atom present in air.

$$O + O_2 + M \rightarrow O_3 \tag{3}$$

Further, a portion of the OH radicals generated in the above formula (2) become hydrogen peroxide ($H_2O_2$) due to the reaction of the following formula (4).

$$OH + OH \rightarrow H_2O_2 \tag{4}$$

Oxidizing particles (O, OH, $O_3$, and $H_2O_2$) generated by the reactions of the above formulas (1) to (4) react, by the following formula (5), with organic matter near the water surface of the water to be treated 4 flowing along the upper surfaces of the ground electrodes 2a, 2b, 2c, and 2d, and oxidatively decompose the organic matter into carbon dioxide ($CO_2$) and water. Note that, in the following formula (5), R is organic matter to be treated.

$$R + (O, OH, O_3, H_2O_2) \rightarrow CO_2 + H_2O \tag{5}$$

Here, O and OH that did not react with the organic matter in the above formula (5) become relatively long-lived $O_3$ and $H_2O_2$ by the above formulas (3) and (4) and a portion thereof is dissolved in the water to be treated 4 by the following formulas (6) and (7). Note that, in the following formulas (6) and (7), (l) indicates a liquid phase.

$$O_3 \rightarrow O_3(l) \tag{6}$$

$$H_2O_2 \rightarrow H_2O_2(l) \tag{7}$$

$O_3$ (l) and $H_2O_2$ (l) generate OH radicals by a reaction in water as shown in the following formula (8).

$$O_3(l) + H_2O_2(l) \rightarrow OH(l) \tag{8}$$

$O_3$ (l), $H_2O_2$ (l), and OH (l) generated in the above formulas (6) to (8) decompose organic matter through a reaction in water by the following formula (9).

$$R + (O_3(l), H_2O_2(l), OH(l)) \rightarrow CO_2 + H_2O \tag{9}$$

In the first embodiment, in regions where the water to be treated 4 is in contact with the lower discharges 12a, 12b, 12c, 12d, and 12e, organic matter in the water to be treated 4 is decomposed by the reactions of both of the above formulas (5) and (9). Meanwhile, in regions where the water to be treated 4 is not in contact with the lower discharges 12a, 12b, 12c, 12d, and 12e, organic matter in the water to be treated 4 is decomposed by the reaction of the above formula (9).

Further, ozone and hydrogen peroxide are also generated by the reactions of the above formulas (1) to (4) by the upper discharges 11a, 11b, 11c, 11 d and 11 e. This being the case, the reactions of the above formulas (6) to (9) occur frequently, facilitating the decomposition of organic matter through a reaction in water.

As described above, in the first embodiment, the lower discharges 12a, 12b, 12c, 12d, and 12e and the upper discharges 11a, 11b, 11c, 11d, and 11e are both formed with respect to the wire electrodes 6a, 6b, 6c, 6d, and 6e.

Therefore, in comparison to a case in which only the lower discharges 12a, 12b, 12c, 12d, and 12e, that is, discharges directed toward to the water film 3, are formed, the discharge region in the treatment tank 1 is expanded and larger amounts of ozone and hydrogen peroxide are generated. As a result, ozone and hydrogen peroxide consumed as organic matter decomposes are quickly replenished, such that high-speed water treatment can be performed in the small treatment tank 1.

Further, the lower discharges 12a, 12b, 12c, 12d, and 12e are discharges that are directed toward the water film 3. For this reason, the discharges occur in a gas containing a relatively high concentration of water molecules, or at an interface between the gas and the water film 3. Accordingly, the reactions of the above formulas (2) and (4) occur frequently and generation of hydrogen peroxide is increased.

Meanwhile, the upper discharges 11a, 11b, 11c, 11d, and 11e are discharges at places removed from the water film 3. For this reason, the discharges occur in a gas containing a relatively low concentration of water molecules. Accordingly, the reactions of the above formulas (1) and (3) occur frequently and generation of ozone is increased.

Here, a concentration ratio of $O_3$ (l) and $H_2O_2$ (l) needs to be suitable in order to allow efficient generation of OH (l) by the abovementioned formula (8). If only the lower discharges 12a, 12b, 12c, 12d and 12e are formed, however, $H_2O_2$ (l) may become excessive while $O_3$ (l) becomes deficient.

However, in the first embodiment, a large amount of ozone is generated by the upper discharges 11a, 11b, 11c, 11d, and 11e. For this reason, the $O_3$ (l) deficiency is eliminated, and efficient treatment of persistent substances becomes possible.

Figure 3:
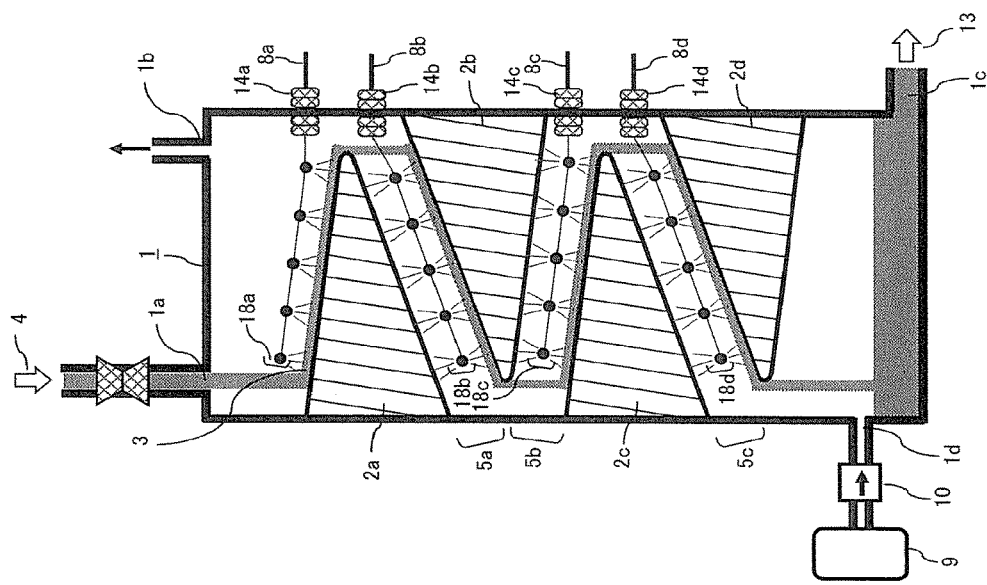
FIG. 3 is a cross-sectional view of the water treatment apparatus according to the first embodiment of the present invention.

Note that, although a case has been described in which the ground electrodes 2a, 2b, 2c, and 2d having the isosceles triangular column shape shown in FIG. 1 are used, a shape of the ground electrodes is not limited thereto. FIG. 3 is a cross-sectional view of the water treatment apparatus according to the first embodiment of the present invention, wherein the shape of the ground electrodes is different from that shown in FIG. 1.

As shown in FIG. 3, for example, the shape of the ground electrodes can be set as a triangular column shape in which lengths of the two oblique sides differ from each other. In FIG. 3, the inclination of the upper surfaces of the ground electrodes 2a and 2c is gentler than the inclination of the lower surfaces thereof, whereas the inclination of the upper surfaces of the ground electrodes 2b and 2d is steeper than that of the lower surfaces thereof.

Further, the lower surface of the ground electrode 2a and the upper surface of the ground electrode 2b have the same inclination angle. Similarly therebelow, the lower surface of the ground electrode 2b and the upper surface of the ground electrode 2c have the same inclination angle, and the lower surface of the ground electrode 2c and the upper surface of the ground electrode 2d have the same inclination angle. Accordingly, heights of all the gaps 5a, 5b, and 5c are uniform across a plane. Other configurations are the same as those in FIG. 1. The same effect as that exhibited by the configuration in FIG. 1 can also be obtained with the configuration shown in FIG. 3.

Note that, in the first embodiment described above, the pulse power supply 7 is used for discharge formation. However, as long as a discharge can be stably formed, a power supply applied to the present invention is not necessarily required to be a pulse power supply and may be, for example, an AC power supply or a DC power supply.

Further, a polarity, a peak voltage value, a repetition frequency, a pulse width, and the like of a voltage output by the pulse power supply 7 can be appropriately determined in accordance with various conditions such as electrode structure and gas type. In general, a peak voltage value of 1 kV to 50 kV is desirable. This is because a stable discharge cannot be formed if the voltage is less than 1 kV, and cost increases markedly if the voltage set to more than 50 kV due to enlargement of the power supply and difficulties involved in electrical insulation.

Further, a repetition frequency of not less than 10 pps (pulse-per-second) and not more than 100 kpps is desirable. This is because if the repetition frequency is lower than 10 pps, a very high voltage is required to apply sufficient discharge power, whereas if the repetition frequency is higher than 100 kpps, the effect of the water treatment is saturated and power efficiency decreases.

Further, the voltage, the pulse width, and the pulse repetition frequency may be adjusted in accordance with at least one of the flow rate of the water to be treated 4 or a water quality of a substance to be treated.

Moreover, it is preferable to use a metal material that has excellent resistance to corrosion, such as stainless steel or titanium, for the ground electrodes 2a, 2b, 2c, and 2d and the wire electrodes 6a, 6b, 6c, 6d, and 6e. However, conductive materials other than these can also be used. Further, the surfaces of the ground electrodes 2a, 2b, 2c, and 2d or the wire electrodes 6a, 6b, 6c, 6d, and 6e may be covered with a dielectric such as glass or ceramic.

Further, in the first embodiment described above, the wire electrodes 6a, 6b, 6c, 6d, and 6e are used as the discharge electrodes 18a, 18b, 18c, and 18d. However, the discharge electrodes are not necessarily in the form of a wire. For example, a rod, a needle, a mesh, a screw, a ribbon, a punching metal, or the like can also be used as the discharge electrodes. However, in order to form a stable discharge at a relatively low voltage, it is preferable to set the form of the discharge electrodes as a wire, a needle, a mesh, a screw, or a ribbon shape, in which electric field concentration occurs more readily than with a plate shape.

Moreover, in the first embodiment described above, the interior of the treatment tank 1 is set to an atmosphere having a high oxygen concentration by supplying oxygen gas thereto from the gas supply source 9. However, a gas type is not limited to oxygen. As long as in a gas containing oxygen, the reactions of the above formulas (1) to (9) occur, such that water treatment can be performed.

For example, nitrogen or a rare gas can be mixed with oxygen at an arbitrary ratio. In particular, if a rare gas is used, it is possible to stably form a discharge even at relatively low voltages, and if air is used, a gas cost can be significantly reduced.

Further, a flow rate of the supplied gas does not need to be constant, and can be adjusted as appropriate in accordance with a water quality of the water to be treated 4, discharge conditions, or the like. For example, when a concentration of organic matter in the water to be treated 4 is high, a large quantity of oxygen is consumed in the oxidative decomposition process. For this reason, it is preferable to increase the flow rate of the supplied gas. However, when the concentration of organic matter in the water to be treated 4 is low, by decreasing the flow rate of the supplied gas, a concentration of ozone in the gas increases and the reactions can be speeded up.

In addition, it is also possible to increase the gas flow rate when the apparatus is started up, replace the air in the interior over a short period of time, and then reduce the gas flow rate to a sufficient amount necessary for water treatment. In this way, an amount of gas used can be suppressed and high-speed water treatment is possible.

Moreover, in the first embodiment described above, five of the wire electrodes 6a, 6b, 6c, 6d, and 6e are used as the discharge electrodes 18a, 18b, 18c, and 18d. However, a number of wire electrodes can be changed as appropriate in accordance with dimensions of the ground electrodes 2a, 2b, 2c, and 2d, and the water quality or the treatment flow rate of the water to be treated 4.

Further, the heights of the lower gaps 19a, 19b, 19c, and 19d and the upper gaps 20a, 20b, and 20c can be determined arbitrarily. However, it is preferable that these heights are not less than 1 mm and not more than 50 mm. If these heights are set to less than 1 mm, it becomes difficult to prescribe an accurate height, and if set to more than 50 mm, a very high voltage is required for discharge formation.

Additionally, the heights of the lower gaps 19a, 19b, 19c, and 19d and the upper gaps 20a, 20b, and 20c are not necessarily the same. That is to say, positions of the discharge electrodes 18a, 18b, 18c, and 18d are not necessarily at centers of the gaps 5a, 5b, and 5c. For example, the discharge electrodes 18a, 18b, 18c, and 18d may, in consideration to the thickness of the water film 3, be arranged above the centers of the gaps 5a, 5b, and 5c.

Accordingly, it is possible to equalize a distance from the discharge electrodes 18a, 18b, 18c, and 18d to the lower surfaces of the ground electrodes 2a, 2b, and 2c and a distance from the discharge electrodes 18a, 18b, 18c, and 18d to the water surface of the water film 3, such that the lower discharges 12a, 12b, 12c, 12d, and 12e and the upper discharges 11a, 11b, 11c, 11d, and 11e can be formed so as to be uniform. Conversely, by positioning the discharge electrodes 18a, 18b, 18c, and 18d below the centers of the gaps 5a, 5b, and 5c, discharges to the water surface of the water to be treated 4, in other words, the lower discharges 12a, 12b, 12c, 12d, and 12e, can be made comparatively strong, and discharges in a gas phase, in other words, the upper discharges 11a, 11b, 11c, 11d, and 11e, can be made comparatively weak. Accordingly, it possible to change a ratio of ozone and hydrogen peroxide supplied to the water to be treated 4 so that a relatively large amount of hydrogen peroxide is supplied.

Further, it is desirable to set a pressure in the treatment tank 1 at or near to atmospheric pressure so as to make supply and drainage of the water to be treated 4 easier. Where necessary, however, positive pressure or negative pressure can also be applied. When positive pressure is applied in the treatment tank 1, contamination by air from the exterior is suppressed, and the atmosphere in the treatment tank 1 becomes easier to manage.

In addition, when negative pressure is applied in the treatment tank 1, the lower discharges 12a, 12b, 12c, 12d, and 12e and the upper discharges 11a, 11b, 11c, 11d, and He are formed at a relatively low voltage, such that it is possible to downsize and simplify the power supply. Moreover, as the discharges are more inclined to disperse when the pressure is lower, the water to be treated 4 comes into contact with the lower discharges 12a, 12b, 12c, 12d, and 12e over a wider region, such that efficiency and speed of the water treatment are improved.

Note that, in the first embodiment described above, four of the ground electrodes 2a, 2b, 2c, and 2d are used. However, a number of ground electrodes can be set as appropriate in accordance with dimensions of the treatment tank 1, a required water treatment capacity, or the like.

Second Embodiment

Figure 4:
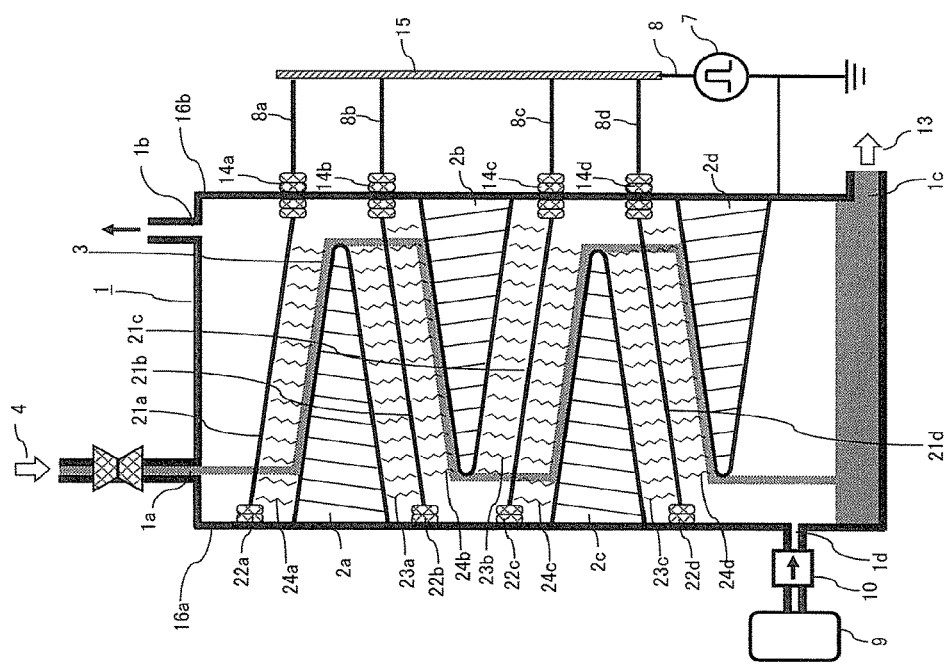
FIG. 4 is a cross-sectional view of a water treatment apparatus according to a second embodiment of the present invention.

FIG. 4 is a cross-sectional view of a water treatment apparatus according to a second embodiment of the present invention. In the second embodiment, the positions of wire electrodes 21a, 21b, 21c, and 21d, that is, discharge electrodes are different from those in the first embodiment.

In FIG. 4, the wire electrode 21a is provided above a ground electrode 2a and in the left-right direction of the page so as to have the same inclination as an upper surface of the ground electrode 2a. In addition, the wire electrode 21a is held by an insulator 22a, that is, an insulating member provided on a left sidewall 16a, that is, an outer peripheral wall of a treatment tank 1, and a current introduction terminal 14a provided on a right sidewall 16b, that is, the outer peripheral wall of the treatment tank 1. Further, a plurality of the wire electrodes 21a are provided in depth direction of the page on which FIG. 4 is depicted so as to cover the upper surface of the ground electrode 2a.

In the same way, the wire electrode 21b is provided above a ground electrode 2b by an insulator 22b and a current introduction terminal 14b. In the same way, the wire electrode 21c is provided above a ground electrode 2c by an insulator 22c and a current introduction terminal 14c. In the same way, the wire electrode 21d is provided above a ground electrode 2d by an insulator 22d and a current introduction terminal 14d.

The wire electrodes 21a, 21b, 21c, and 21d are respectively connected to wires 8a, 8b, 8c, and 8d. The wires 8a, 8b, 8c, and 8d are connected to the bus bar 15 outside the treatment tank 1.

The bus bar 15 is connected to a high voltage output side of a pulse power supply 7 by a wire 8. Meanwhile, a ground side of the pulse power supply 7 is connected to the treatment tank 1 and electrically grounded. Other configurations are the same as those of the first embodiment.

Next, operations of the water treatment apparatus in the second embodiment will be described. Water to be treated 4 flows downward from an uppermost part of the treatment tank 1 in the form of a water film 3 over respective upper surfaces of the ground electrodes 2a, 2b, 2c, and 2d, and is drained from a lowermost part of the treatment tank 1. At this time, a film thickness of the water film 3 is adjusted so that the wire electrodes 21a, 21b, 21c, and 21d are not submerged.

The pulse power supply 7 is operated such that a pulse voltage is applied to the wire electrodes 21a, 21b, 21c, and 21d. As a result, a lower discharge 24a is formed between the wire electrode 21a and the upper surface of the ground electrode 2a. Further, an upper discharge 23a is formed between the wire electrode 21b and the lower surface of the ground electrode 2a, and a lower discharge 24b is formed between the wire electrode 21b and the upper surface of the ground electrode 2b.

Similarly therebelow, an upper discharge 23b and a lower discharge 24c are formed respectively above and below the wire electrode 21c, and an upper discharge 23c and a lower discharge 24d are formed respectively above and below the wire electrode 21d. Other operations are the same as those of the first embodiment.

In the first embodiment, the wire electrodes 6a, 6b, 6c, 6d, and 6e are provided so as to extend in the depth direction of the page on which FIG. 2 is depicted. That is, the wire electrodes 6a, 6b, 6c, 6d, and 6e are formed on a horizontal plane so as not to be inclined.

However, water droplets formed when the water to be treated 4 falls and water droplets formed by water vapour in the treatment tank 1 may, in some cases, adhere to the wire electrodes. When the water droplets adhere to the wire electrodes in this way, distances between the wire electrodes and the ground electrodes 2a, 2b, 2c, and 2d are reduced in those areas. As a result, stronger discharges are formed only in areas to which the water droplets are attached and, in some cases, efficiency of water treatment may decrease due to localised temperature increases and the like.

However, with the second embodiment, the wire electrodes 21a, 21b, 21c, and 21d are provided at an incline, such that the water droplets adhered to the wire electrodes run down along this inclination. For this reason, an effect can be obtained in which uniform discharges are formed throughout the entire apparatus without formation of strong localised discharges, and efficient water treatment can be performed.

Third Embodiment

Figure 5:
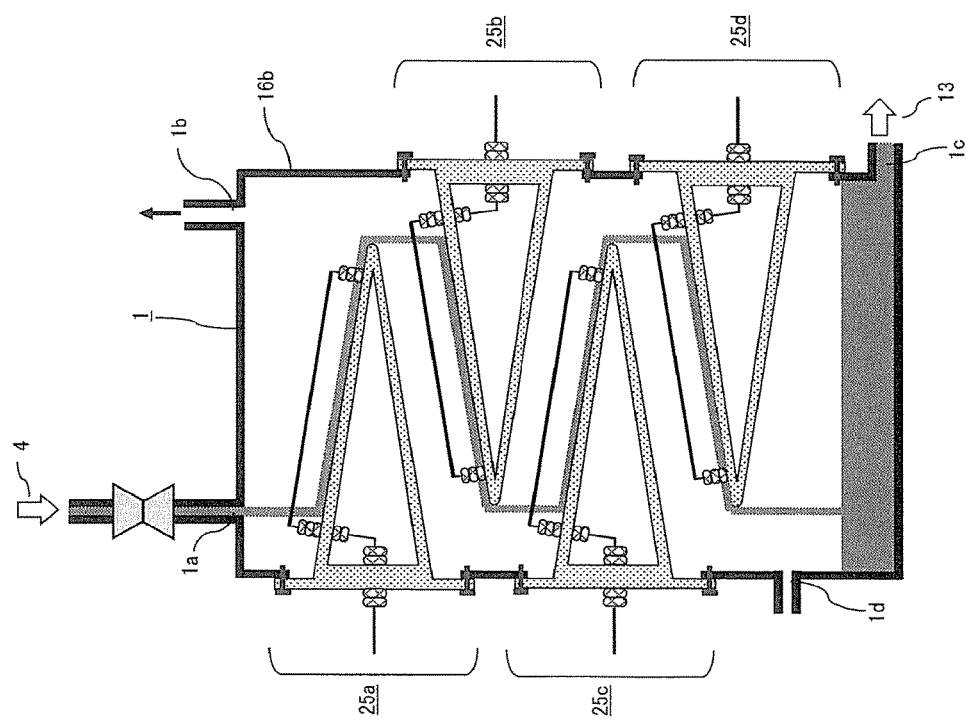
FIG. 5 is a cross-sectional view of a water treatment apparatus according to a third embodiment of the present invention.
Figure 6:
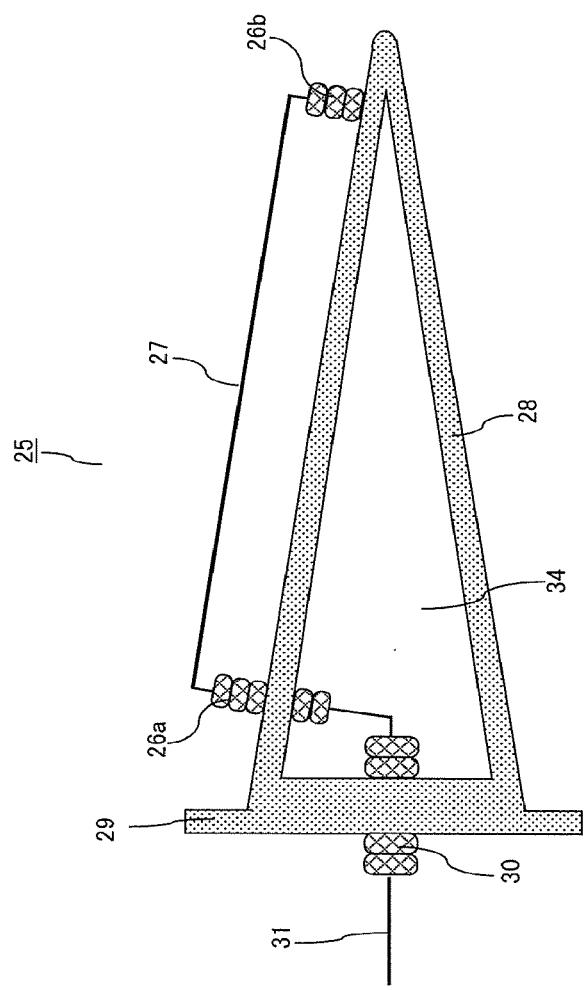
FIG. 6 is an enlarged cross-sectional view of a ground cartridge shown in FIG. 5 according to the third embodiment of the present invention.
Figure 7:
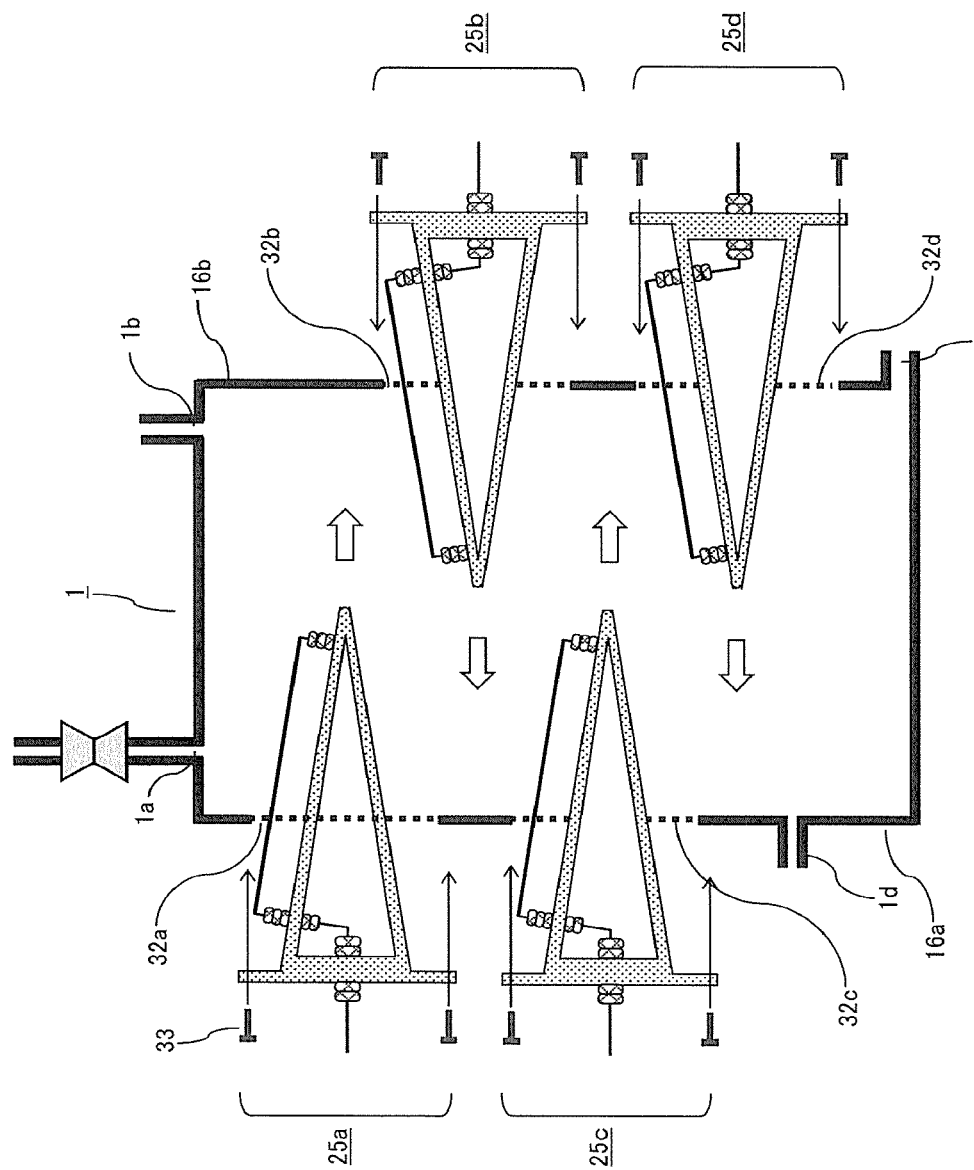
FIG. 7 is a cross-sectional view showing an assembly method for the water treatment apparatus according to the third embodiment of the present invention.

FIG. 5 is a cross-sectional view of a water treatment apparatus according to a third embodiment of the present invention. FIG. 6 is an enlarged cross-sectional view of a ground cartridge 25 shown in FIG. 5 according to the third embodiment of the present invention. Further, FIG. 7 is a cross-sectional view showing an assembly method for the water treatment apparatus according to the third embodiment of the present invention. The water treatment apparatus in the third embodiment will be described hereinafter using FIG. 5 to FIG. 7.

In the water treatment apparatus according to the third embodiment, four ground cartridges 25a, 25b, 25c, and 25d are arranged sequentially in a plumb direction (a vertical direction) in an interior of a metal treatment tank 1 having a hermetically sealed structure. That is to say, the ground cartridge 25a is provided at an uppermost location, the ground cartridge 25b is provided below the ground cartridge 25a, the ground cartridge 25c is provided below the ground cartridge 25b, and the ground cartridge 25d is provided at a lowermost location.

The four ground cartridges 25a, 25b, 25c, and 25d all have the same shape. In view of this, a detailed configuration of the ground cartridge 25 will be described using FIG. 6. In FIG. 6, the ground cartridge 25 is constituted by a metal ground electrode 28 and a metal flange 29 connected to the ground electrode 28.

The ground electrode 28 has a hollow isosceles triangular column shape, and the isosceles triangular shape shown in FIG. 6 elongates in a depth direction of the page. Two equal sides (oblique sides) of the isosceles triangular shape of the ground electrode 28 are arranged so as to be symmetrical to each other with respect to a horizontal plane. In other words, the two oblique sides are inclined in mutually opposing directions with respect to the horizontal plane.

A flange 29 is connected to another side (a base) of the isosceles triangular shape, and the flange 29 faces the plumb direction. A current introduction terminal 30 is provided so as to pass through the flange 29 and the base of the ground electrode 28.

Further, an upstream insulating body 26a, which is an insulating member that passes through into a hollow area 34 from an upper surface of the ground electrode 28, and a downstream insulating body 26b, which is an insulating member that is attached to the upper surface of the ground electrode 28, are provided. A wire electrode 27 is attached above the ground electrode 28 and in parallel to the upper surface of the ground electrode 28 by the upstream insulating body 26a and the downstream insulating body 26b.

Note that a plurality of the wire electrodes 27 are provided in a depth direction of the page on which FIG. 6 is depicted, and are disposed so as to cover the upper surface of the ground electrode 28. In addition, the wire electrode 27 is held so as to be electrically insulated from the ground electrode 28 by the upstream insulating body 26a and the downstream insulating body 26b.

An electric wire 31 passes from an exterior of the ground cartridge 25 into the hollow area 34 through the current introduction terminal 30 and, further, passes through the upstream insulating body 26a and is connected to the wire electrode 27. In addition, the electric wire 31 is electrically insulated from the ground cartridge 25 by the current introduction terminal 30 and the upstream insulating body 26a.

In FIG. 7, a plurality (two in FIG. 7) of openings 32a and 32c arranged in a vertical direction are provided on a left sidewall 16a, that is, an outer peripheral wall of the treatment tank 1. Meanwhile, two openings 32b and 32d arranged in the vertical direction are provided on a right sidewall 16b, that is, the outer peripheral wall of the treatment tank 1.

Here, the opening 32b and the opening 32d are respectively formed at positions lower than the openings 32a and 32c by a height that is just half the interval between the openings 32a and 32c. In addition, the openings 32a, 32b, 32c, and 32d have an opening area that corresponds to a size of the flange 29.

The ground cartridge 25a is inserted into the opening 32a, and the flange 29 and the left sidewall 16a are fastened to each other by a bolt 33. In the same way, the ground cartridge 25b is inserted into the opening 32b, the ground cartridge 25c is inserted into the opening 32c, and the ground cartridge 25d is inserted into the opening 32d, and the respective flanges 29 are fastened by bolts 33. Accordingly, the water treatment apparatus shown in FIG. 5 is assembled.

In FIG. 5, heights of gaps between the ground cartridges 25a and 25b, between the ground cartridges 25b and 25c, and between the ground cartridges 25c and 25d are respectively uniform. Further, in FIG. 5, the wire electrodes 27 are disposed at substantially central heights in the respective gaps formed by the ground cartridges 25a, 25b, 25c, and 25d.

Moreover, the respective electric wires 31 of the ground cartridges 25a, 25b, 25c, and 25d are connected to a pulse power supply (not shown), and the treatment tank 1 is electrically grounded. Further, each of the flanges 29 of the ground cartridges 25a, 25b, 25c, and 25d is electrically connected to and conductive with the treatment tank 1.

Next, operations of the water treatment apparatus in the third embodiment will be described. Water to be treated 4 flows downward from an uppermost part of the treatment tank 1 in the form of a water film over upper surfaces of the respective ground electrodes of the ground cartridges 25a, 25b, 25c, and 25d, and is drained from a lowermost part of the treatment tank 1.

Here, when the water to be treated 4 flows downward, the pulse power supply is operated so as to form a discharge between the wire electrode 27 and the upper surface of the ground electrode 28 of the ground cartridge 25a. Discharges are also formed between the wire electrode 27 of the ground cartridge 25b and the lower surface of the ground electrode 28 of the ground cartridge 25a, and between the wire electrode 27 and the upper surface of the ground electrode 28 of the ground cartridge 25b. The same applies therebelow. Other operations are the same as those of the first embodiment.

With the third embodiment, the water treatment apparatus can be formed just by inserting the ground cartridges 25a, 25b, 25c, and 25d into the treatment tank 1 and fastening the same by using the bolts 33. For this reason, an effect can be obtained in which assembly is easy.

Further, the ground cartridges 25a, 25b, 25c, and 25d all have the same shape. Therefore, by mass-producing the ground cartridges, it is possible to easily manufacture a large water treatment apparatus or a plurality of water treatment apparatuses. Moreover, even if a failure does occur, repairs can be made just by replacing a ground cartridge in an affected area, such that maintainability is improved, which leads to an improved apparatus operating ratio.

Note that, in the third embodiment, a case was described in which four of the openings 32a, 32b, 32c, and 32d are provided in the treatment tank 1, and four of the ground cartridges 25a, 25b, 25c, 25d are mounted thereto. However, a number of openings and a number of ground cartridges are not limited thereto. For example, it is possible to form the treatment tank 1 so as to be higher, form more than four through-holes therein, attach as many ground cartridges as is necessary thereto, and put a cover over the remaining openings.

Accordingly, necessary and enough discharges can be formed so as to correspond with a water quality of the water to be treated 4, and as a result, energy efficiency of water treatment is improved. Moreover, it hereby becomes unnecessary to individually design water treatment apparatuses to correspond with the water quality of the water to be treated 4, and design costs can be suppressed.

Fourth Embodiment

Figure 8:
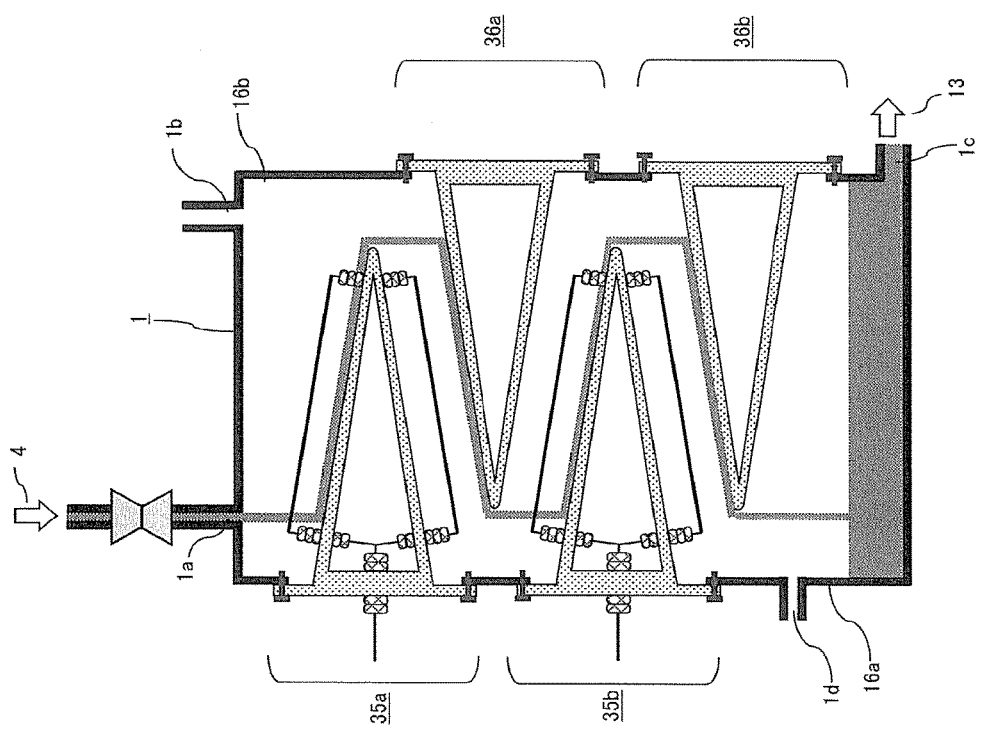
FIG. 8 is a cross-sectional view of a water treatment apparatus according to a fourth embodiment of the present invention.
Figure 9:
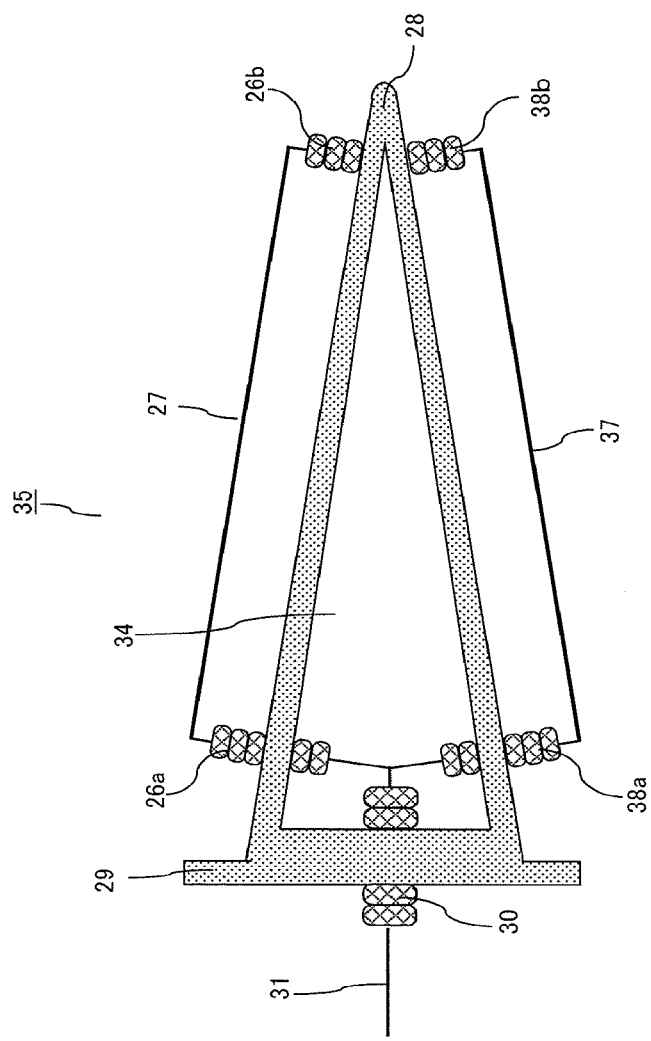
FIG. 9 is an enlarged cross-sectional view of a first-type ground cartridge shown in FIG. 8 according to the fourth embodiment of the present invention.
Figure 10:
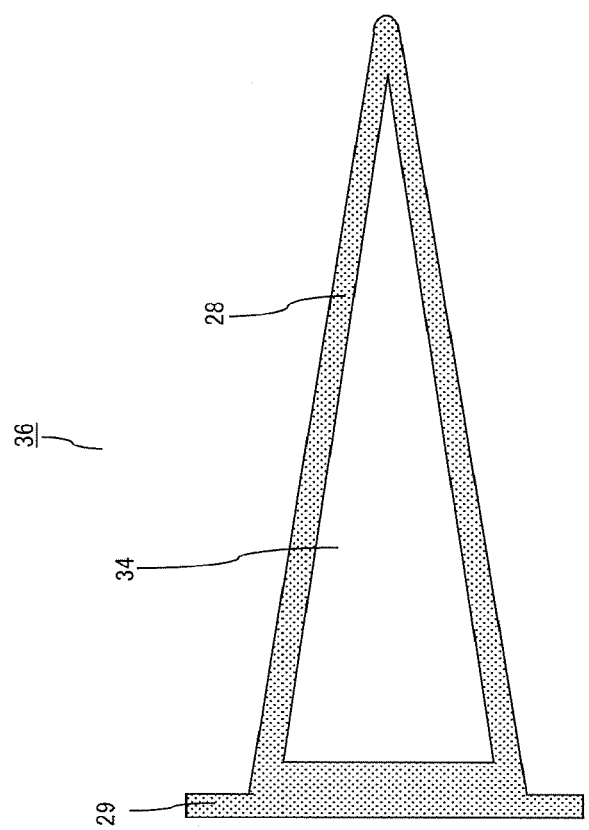
FIG. 10 is an enlarged cross-sectional view of a second-type ground cartridge shown in FIG. 8 according to the fourth embodiment of the present invention.

FIG. 8 is a cross-sectional view of a water treatment apparatus according to a fourth embodiment of the present invention. FIG. 9 is an enlarged cross-sectional view of a first-type ground cartridge 35 shown in FIG. 8 according to the fourth embodiment of the present invention. Further, FIG. 10 is an enlarged cross-sectional view of a second-type ground cartridge 36 shown in FIG. 8 according to the fourth embodiment of the present invention.

The fourth embodiment differs from the third embodiment in that two types of ground cartridge 35 and 36 are provided, each having a different configuration. The water treatment apparatus in the fourth embodiment will be described hereinafter using FIG. 8 to FIG. 10.

In the fourth embodiment, ground cartridges 35a and 35b are respectively attached in place of the ground cartridges 25a and 25c, shown in FIG. 5, in the third embodiment. In the same way, ground cartridges 36a and 36b are attached in place of the ground cartridges 25b and 25d shown in FIG. 5.

In FIG. 9, a ground cartridge 35 is provided with an upstream insulating body 38a, which is an insulating member that passes through a lower surface of a ground electrode 28 to arrive at a hollow area 34, and a downstream insulating body 38b, which is an insulating member provided on the lower surface of the ground electrode 28.

A wire electrode 37 is attached below the ground electrode 28 and in parallel to the lower surface of the ground electrode 28 by the upstream insulating body 38a and the downstream insulating body 38b. Note that a plurality of wire electrodes 37 are provided in a depth direction of the page on which FIG. 9 is depicted, and are disposed so as to cover the lower surface of the ground electrode 28.

An electric wire 31 passes from an exterior of the ground cartridge 35 into the hollow area 34 through the current introduction terminal 30, passes through the upstream insulating body 26a and is connected to the wire electrode 27, and also passes through the upstream insulating body 38a and is connected to the wire electrode 37.

Further, the wire electrode 37 is held so as to be electrically insulated from the ground electrode 28 by the upstream insulating body 38a and the downstream insulating body 38b. In addition, the electric wire 31 is electrically insulated from the ground cartridge 35 by the current introduction terminal 30, the upstream insulating body 26a, and the upstream insulating body 38a. Other configurations are the same as those of the third embodiment.

In FIG. 10, the ground cartridge 36 is constituted by a ground electrode 28 and a flange 29 only. In other words, upon comparison with the ground cartridge 35, the ground cartridge 36 is not provided with an upstream insulating body 26a, a downstream insulating body 26b, a wire electrode 27, a current introduction terminal 30, an electric wire 31, a wire electrode 37, an upstream insulating body 38a, or a downstream insulating body 38b.

In FIG. 8, two of the ground cartridges 35a and 35b arranged sequentially in the vertical direction are attached to the left sidewall 16a of the treatment tank 1. Meanwhile, two of the ground cartridges 36a and 36b arranged sequentially in the vertical direction are attached to the right sidewall 16b of the treatment tank 1.

Here, the ground cartridge 36a is disposed between the ground cartridges 35a and 35b, and the ground cartridge 35b is disposed between the ground cartridges 36a and 36b. That is to say, the ground cartridge 35a, the ground cartridge 36a, the ground cartridge 35b, and the ground cartridge 36b are attached in this order from top-to-bottom and so as to alternate between left and right in the interior of the treatment tank 1.

Further, in FIG. 8, the wire electrodes 37 are disposed at substantially central heights in the respective gaps formed by the ground cartridges 35a, 36a, 35b, and 36b. Moreover, the respective electric wires 31 of the ground cartridges 35a and 35b are connected to a pulse power supply (not shown), and the treatment tank 1 is electrically grounded. Further, each of the flanges 29 of the ground cartridges 35a and 35b and the ground cartridges 36a and 36b is electrically connected to and conductive with the treatment tank 1.

Next, operations of the water treatment apparatus in the fourth embodiment will be described. Water to be treated 4 flows downward from an uppermost part of the treatment tank 1 in the form of a water film over upper surfaces of the respective ground electrodes 28 of the ground cartridge 35a, the ground cartridge 36a, the ground cartridge 35b, and the ground cartridge 36b, and is drained from a lowermost part of the treatment tank 1.

Here, when the water to be treated 4 flows downward, the pulse power supply is operated so as to form a discharge between the wire electrode 27 and the upper surface of the ground electrode 28 of the ground cartridge 35a. Discharges are also formed between the wire electrode 37 of the ground cartridge 35a and the lower surface of the ground electrode 28 of the ground cartridge 35a, and between the wire electrode 37 of the ground cartridge 35a and the upper surface of the ground electrode 28 of the ground cartridge 36a. The same applies therebelow. Other operations are the same as those of the third embodiment.

With the fourth embodiment, discharges can be formed in the same way as in the third embodiment by supplying electricity to the respective electric wires 31 of the ground cartridges 35a and 35b. Therefore, in comparison to the third embodiment, the electric wires for supplying electricity can be simplified and shortened.

As a result, an apparatus configuration can be simplified. Further, it is possible to reduce the load placed on the pulse power supply 7 (not shown) by the electric wires. Hence, in the water treatment apparatus according to the fourth embodiment, a smaller and less expensive power supply can be used than in the water treatment apparatus according to the third embodiment.

Fifth Embodiment

Figure 11:
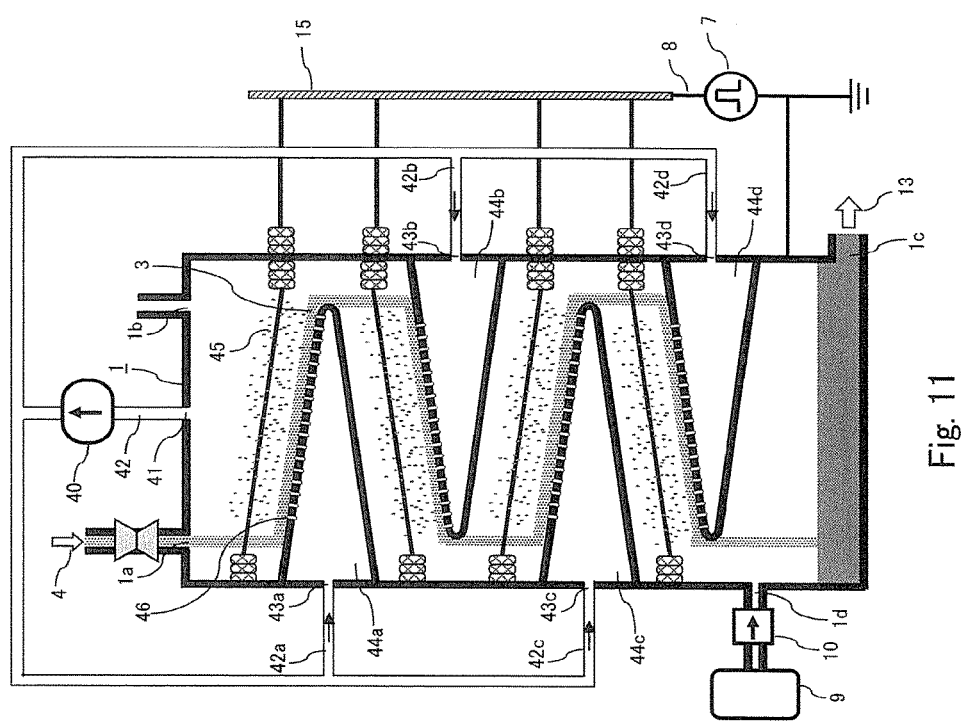
FIG. 11 is a cross-sectional view of a water treatment apparatus according to a fifth embodiment of the present invention.

FIG. 11 is a cross-sectional view of a water treatment apparatus according to a fifth embodiment of the present invention. In FIG. 11, the ground electrodes 44a, 44b, 44c, and 44d all have the same shape and have a hollow structure. Bases of each of the ground electrodes 44a, 44b, 44c, and 44d are connected to sidewalls of the treatment tank 1, and connection ports 43a, 43b, 43c, and 43d, that is, through-holes that continue through into the bases of each of the ground electrodes 44a, 44b, 44c, and 44d from the sidewalls of the treatment tank 1, are formed. In addition, a plurality of pores 46, that is, penetrating holes, are formed on upper surfaces of the ground electrodes 44a, 44b, 44c, and 44d.

A suction port 41 is provided at an upper part of the treatment tank 1, and a circulation pipe 42 is connected to the suction port 41. The circulation pipe 42 is provided with a circulation pump 40, and the circulation pipe 42 is branched at a downstream side of the circulation pump 40 (on an opposite side to the suction port 41) and forms circulation pipes 42a, 42b, 42c, and 42d.

Further, the circulation pipes 42a, 42b, 42c, and 42d are respectively connected to the connection ports 43a, 43b, 43c, and 43d. Other configurations are the same as those of the second embodiment.

Next, operations of the water treatment apparatus in the fifth embodiment will be described. Water to be treated 4 is supplied from an uppermost part of the treatment tank 1, flows downward in the form of a water film 3 over the respective upper surfaces of the ground electrodes 44a, 44b, 44c, and 44d, and is drained from a lowermost part of the treatment tank 1. Here, in the fifth embodiment, the circulation pump 40 is operated such that gas in the treatment tank 1 is sucked out from the suction port 41 and supplied to the connection ports 43a, 43b, 43c, and 43d.

Circulated gas supplied to the connection ports 43a, 43b, 43c, and 43d passes through the respective pores 46 of the ground electrodes 44a, 44b, 44c, and 44d and is discharged into the treatment tank 1. As a result, a portion of the water film 3 of the water to be treated 4 flowing over the upper surfaces of the ground electrodes 44a, 44b, 44c, and 44d becomes water droplets 45 and is jetted upward. Other operations are the same as those of the second embodiment.

With the fifth embodiment, the gas in the treatment tank 1 is sucked out by the circulation pump 40 and discharged from the pores 46 formed in the ground electrodes 44a, 44b, 44c, and 44d, such that a portion of the water film 3 can be jetted upward as the water droplets 45. Due to this, contact between the water to be treated 4, discharges, and oxidizing particles such as ozone and OH radicals generated by the discharges, is facilitated.

As a result, water treatment that is even more efficient and even faster than with the second embodiment can be realised. Further, ozone and hydrogen peroxide contained in the circulated gas are dissolved in the water film 3 when discharged from the pores 46. Accordingly, organic matter decomposition reactions in water are facilitated more so than with the second embodiment, such that high-speed, efficient water treatment is performed.

Sixth Embodiment

Figure 12:
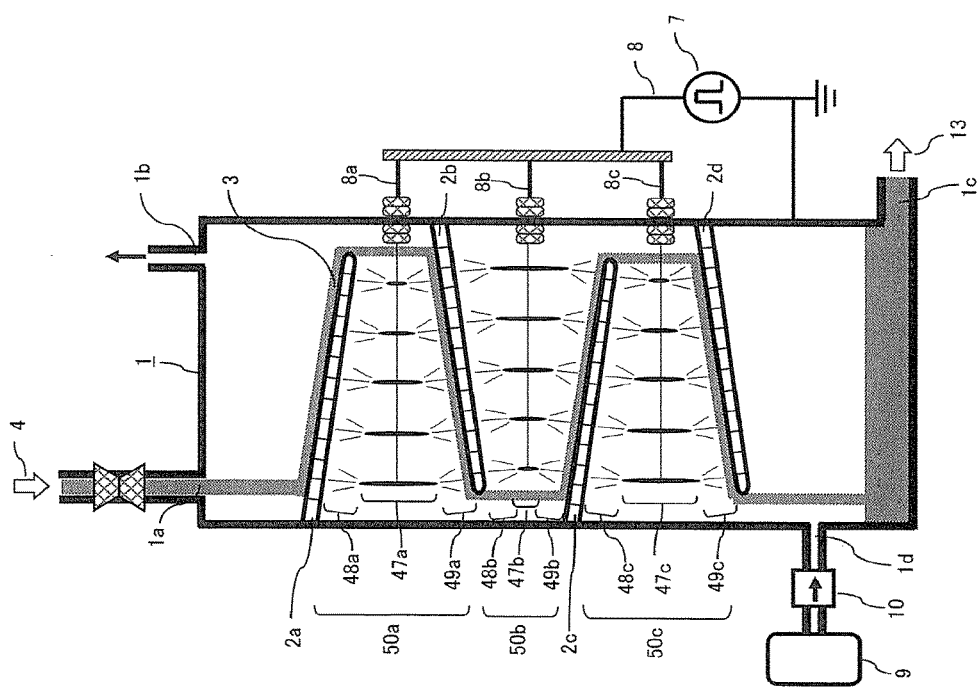
FIG. 12 is a cross-sectional view of a water treatment apparatus according to a sixth embodiment of the present invention.
Figure 13:
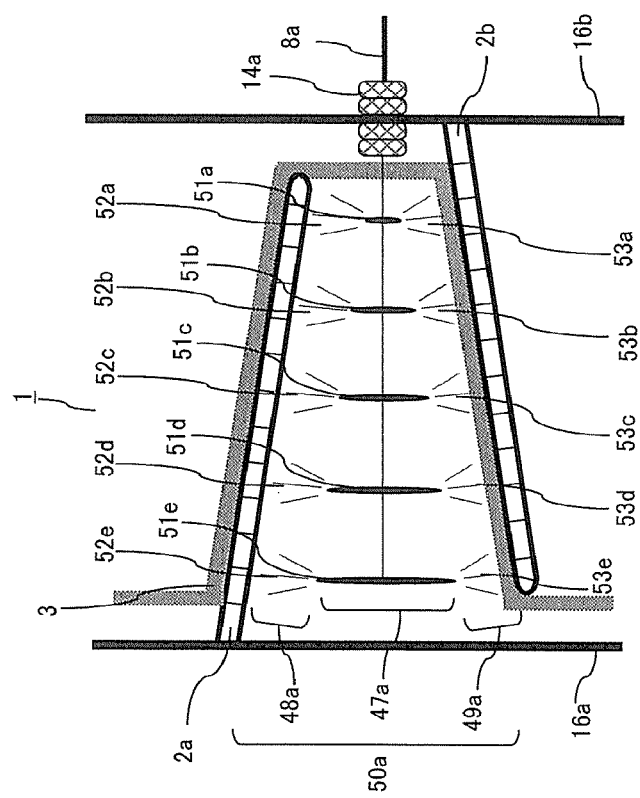
FIG. 13 is an enlarged view of two adjacent ground electrodes and a surrounding area thereof shown in FIG. 12 according to the sixth embodiment of the present invention.

FIG. 12 is a cross-sectional view of a water treatment apparatus according to a sixth embodiment of the present invention. Further, FIG. 13 is an enlarged view of two adjacent ground electrodes 2a and 2b and a surrounding area thereof shown in FIG. 12 according to the sixth embodiment of the present invention. In the sixth embodiment, shapes of ground electrodes 2a, 2b, 2c, and 2d and discharge electrodes 47a, 47b, and 47c differ from those of the first embodiment. In view of this, description with a focus on these differences will be given below using FIG. 12 and FIG. 13.

In FIG. 12, the ground electrodes 2a, 2b, 2c, and 2d are arranged sequentially in a vertical direction in an interior of a treatment tank 1. The ground electrodes 2a, 2b, 2c, and 2d all have the same flat plate shape, and are disposed at an incline with respect to a horizontal plane. Two of the ground electrodes arranged consecutively in the vertical direction are disposed at predetermined intervals in the vertical direction and so as to be bilaterally symmetrical with respect to a plumb plane.

That is to say, in FIG. 12, a left side end portion of the ground electrode 2a is connected to a left sidewall 16a of the treatment tank 1, and right side end portion thereof is held so as to be lower than the left side end portion. Further, a right side end portion of the ground electrode 2b is connected to a right sidewall 16b of the treatment tank 1, and a left side end portion thereof is held so as to be lower than the right side end portion. The same applies to the ground electrodes 2c and 2d therebelow.

Accordingly, a gap 50a is formed between the ground electrodes 2a and 2b, a gap 50b is formed between the ground electrodes 2b and 2c, and a gap 50c is formed between the ground electrodes 2c and 2d. The water to be treated 4 supplied from a water supply port 1a flows downward in a zigzag along respective upper surfaces of the ground electrodes 2a, 2b, 2c, and 2d.

Discharge electrodes 47a, 47b, and 47c are respectively provided in the gaps 50a, 50b, and 50c. A specific configuration of the discharge electrodes 47a, 47b, and 47c will thus be described on the basis of FIG. 13 using the discharge electrode 47a as an example. In FIG. 13, the discharge electrode 47a disposed in the gap 50a is constituted by five ribbon-shaped electrodes (hereinafter referred to as ribbon electrodes) 51a, 51b, 51c, 51d and 51e connected to a wire 8a.

The ribbon electrodes 51a, 51b, 51c, 51d, and 51e are arranged in an order of 51a, 51b, 51c, 51d, and 51e from the right and such that longitudinal surfaces thereof are arranged vertically. Further, with the ribbon electrode 51a being shortest in the vertical direction, the ribbon electrodes become progressively longer in an order of 51b, 51c, 51d, and 51e.

An upper gap 48a having a substantially uniform height is formed between upper ends of the ribbon electrodes 51a, 51b, 51c, 51d, and 51e and a lower surface of the ground electrode 2a. Further, a lower gap 49a having a substantially uniform height is formed between lower ends of the ribbon electrodes 51a, 51b, 51c, 51d, and 51e and the upper surface of the ground electrode 2b. In addition, the upper gap 48a and the lower gap 49a have substantially similar heights.

In the same way for the other discharge electrodes 47b and 47c in FIG. 12, upper gaps 48b and 48c and lower gaps 49b and 49c are formed. Other configurations are the same as those of the first embodiment.

Next, operations of the water treatment apparatus in the sixth embodiment will be described. Water to be treated 4 is supplied from an uppermost part of the treatment tank 1, flows downward in the form of a water film 3 over respective upper surfaces of the ground electrodes 2a, 2b, 2c, and 2d, and is drained from a lowermost part of the treatment tank 1.

Here, when the water to be treated 4 flows downward, a pulse power supply (not shown) is operated and a pulse voltage is applied to the discharge electrodes 47a, 47b, and 47c, such that upper discharges 52a, 52b, 52c, 52d, and 52e are formed in the upper gap 48a. Further, lower discharges 53a, 53b, 53c, 53d, and 53e are formed in the lower gap 49a. Other operations are the same as those of the first embodiment.

In the first embodiment, the gaps 5a, 5b, and 5c having a uniform height are formed between the ground electrodes 2a, 2b, 2c, and 2d arranged sequentially in the vertical direction, such that upper discharges and lower discharges are formed using the wire electrodes 6a, 6b, 6c, 6d, and 6e, all of which have the same shape.

Meanwhile, in the sixth embodiment, the heights of the gaps 50a, 50b, and 50c expand in a flow direction of the water to be treated 4 flowing on the ground electrodes 2b, 2c, and 2d, while dimensions of the ribbon electrodes 51a, 51b, 51c, 51d and 51e are made so as to differ from each other, thereby forming the upper gap 48a and the lower gap 49a having substantially uniform heights. Upper discharges and lower discharges are then respectively formed in the upper gap 48a and the lower gap 49a formed in this way.

With the sixth embodiment, the ground electrodes 2a, 2b, 2c, and 2d can be made so as to have a plate shape such that, in comparison to the first through fifth embodiments, a cost of materials used in relation to the ground electrodes can be reduced, and the apparatus can be made lighter.

Seventh Embodiment

Figure 14:
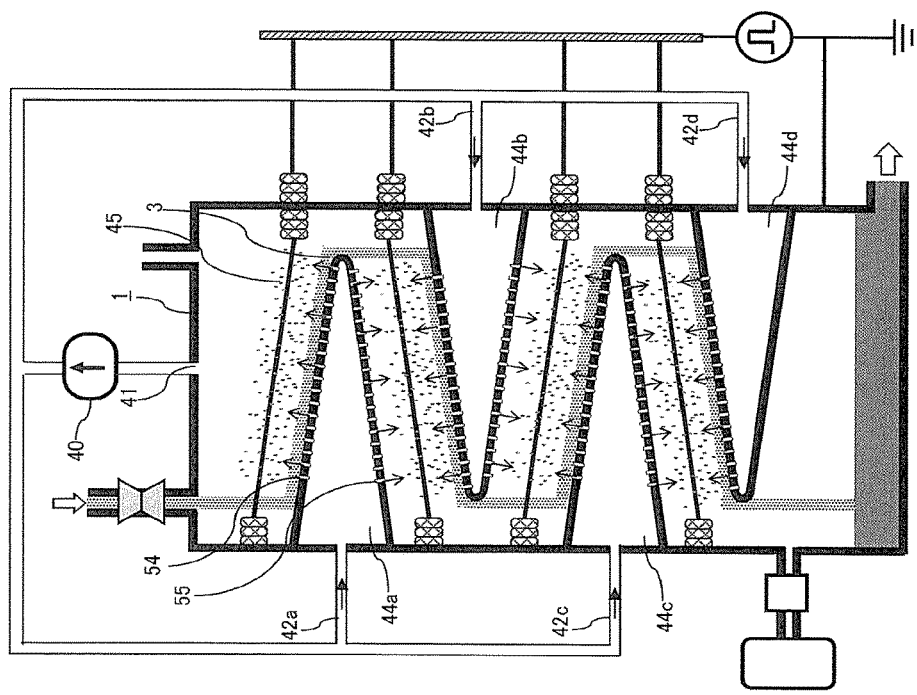
FIG. 14 is a cross-sectional view of a water treatment apparatus according to a seventh embodiment of the present invention.

FIG. 14 is a cross-sectional view of a water treatment apparatus according to a seventh embodiment of the present invention. The seventh embodiment is the same as the fifth embodiment except for that a configuration of ground electrodes 44a, 44b, 44c, and 44d is different.

In the seventh embodiment, a plurality of upper side pores 54, that is, penetrating holes are formed on respective upper surfaces of the ground electrodes 44a, 44b, 44c, and 44d, and a plurality of lower side pores 55, that is, penetrating holes are formed on respective lower surfaces of the ground electrodes 44a, 44b, and 44c. Other configurations are the same as those of the fifth embodiment.

Gas in the treatment tank 1 sucked out by the circulation pump 40 from the suction port 41 at an upper part of the treatment tank 1 passes through circulation pipes 42a, 42b, 42c, and 42d, is supplied into an interior of the ground electrodes 44a, 44b, 44c, and 44d, and is discharged from the upper side pores 54 and the lower side pores 55. As a result, a portion of a water film 3 of water to be treated 4 flowing along the upper surfaces of the ground electrodes 44a, 44b, 44c, and 44d becomes water droplets 45 and is jetted upward.

Further, the gas in the treatment tank 1 containing ozone and hydrogen peroxide is sprayed from the lower side pores 55 onto water surfaces of the water droplets 45 and the water film 3. Other operations are the same as those of the fifth embodiment.

With the seventh embodiment, the gas in the treatment tank 1 is sucked out by the circulation pump 40 and caused to be discharged from the lower side pores 55 formed on the lower surfaces of the ground electrodes 44a, 44b, and 44c, whereby the gas in the treatment tank 1 containing ozone and hydrogen peroxide is sprayed onto the water surfaces of the water droplets 45 and the water film 3.

In this way, mass transfer from a gas phase to a liquid phase is facilitated which, in turn, facilitates the reactions of the above formulas (6) and (7). As a result, ozone and hydrogen peroxide in the treatment tank can be used more efficiently, organic matter decomposition reactions in water are facilitated more so than in the fifth embodiment, and high-speed, highly efficient water treatment is performed.

Note that, as the water to be treated flows along the upper surfaces of the ground electrodes 44a, 44b, 44c, and 44d, the gas passes more easily through the lower side pores 55 than the upper side pores 54 if the upper side pores 54 and the lower side pores 55 have the same pore diameter. Accordingly, by making a pore diameter of the upper side pores 54 larger than a pore diameter of the lower side pores 55, it is possible to eject the gas from both the upper side pores 54 and the lower side pores 55, such that more efficient water treatment is performed.

Eighth Embodiment

Figure 15:
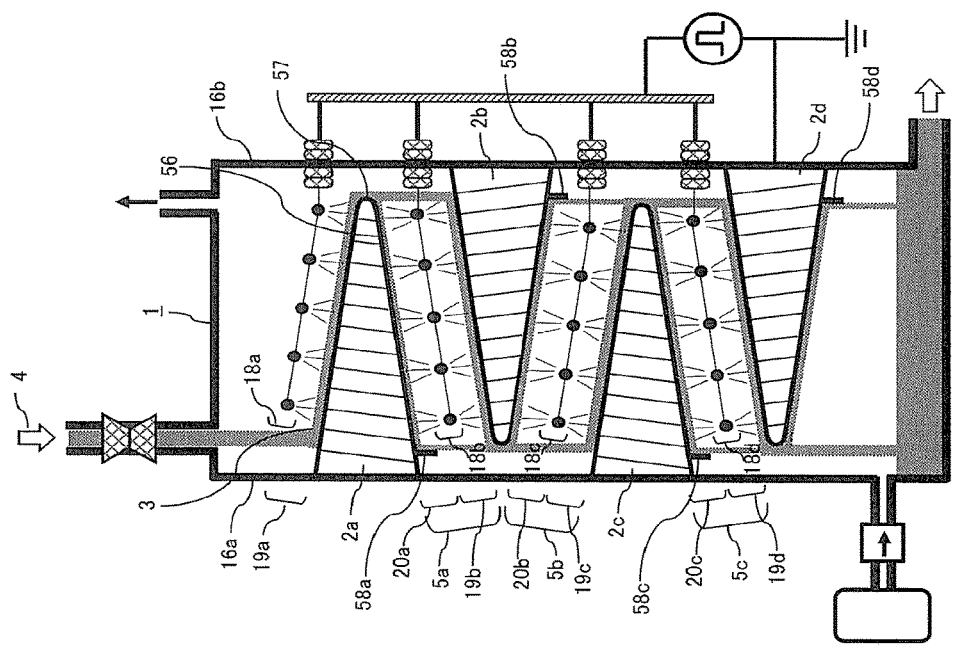
FIG. 15 is a cross-sectional view of a water treatment apparatus according to an eighth embodiment of the present invention.

FIG. 15 is a cross-sectional view of a water treatment apparatus according to an eighth embodiment of the present invention. The eighth embodiment differs from the first embodiment in that a lower side water film 56 is formed on respective lower surfaces of ground electrodes 2a, 2b, 2c, and 2d, and projections 58a, 58b, 58c, and 58d are provided on the respective lower surfaces of the ground electrodes 2a, 2b, 2c, and 2d.

In FIG. 15, the respective lower surfaces of the ground electrodes 2a, 2b, 2c, and 2d are hydrophilic. Further, the projections 58a, 58b, 58c, and 58d are provided in a vicinity of bases of the respective lower surfaces of the ground electrodes 2a, 2b, 2c, and 2d. Other configurations are the same as those of the first embodiment.

Water to be treated 4 supplied to the treatment tank 1 flows downward along an upper surface of the ground electrode 2a having an isosceles triangular column shape while forming a water film 3. At an apex 57 of the ground electrode 2a, a portion of the water to be treated 4 falls downward toward the ground electrode 2b, and remaining water to be treated 4 adheres to the lower surface of the ground electrode 2a due to surface tension and flows downward while forming the lower side water film 56.

The lower side water film 56 falls away from the lower surface of the ground electrode 2a due to the projection 58a. Similarly therebelow, a portion of the water to be treated 4 likewise adheres to the respective lower surfaces of the ground electrodes 2b, 2c, and 2d, and flows downward while forming the lower side water film 56. Other operations are the same as those of the first embodiment.

With the eighth embodiment, the lower side water film 56 is formed on the respective lower surfaces of the ground electrodes 2a, 2b, 2c, and 2d, and a water surface of the lower side water film 56 touches upper discharges 11 (not shown). For this reason, in comparison to the first embodiment, in which the water to be treated 4 flows downward while forming only the water film 3 on the upper surfaces of the ground electrodes 2a, 2b, 2c, and 2d, an area of the water to be treated 4 that touches the discharges is increased.

Accordingly, in the eighth embodiment, in comparison to the first embodiment, the reactions of the above formulas (5), (6), and (7) occur more frequently and speed and efficiency of water treatment are improved. In addition, when compared using the treatment tank 1 having the same volume, the area over which the water to be treated 4 and the discharges touch is increased over that of the first embodiment. As a result, a water treatment capacity can be increased.

Note that the respective lower surfaces of the ground electrodes 2a, 2b, 2c, and 2d can be made hydrophilic by forming the lower surfaces from a hydrophilic material, by coating the lower surfaces with a hydrophilic material, or by applying a hydrophilic treatment thereto.

Specifically, with the configuration of the invention of the present application, discharges are formed against the lower surfaces of the ground electrodes 2a, 2b, and 2c such that, after a predetermined time period has elapsed, the lower surfaces of the ground electrodes 2a, 2b, and 2c are rendered hydrophilic due to the action of ozone or the like generated by the discharges. The configuration and the operation of the eighth embodiment are realized as a result.

In addition, the projections 58a, 58b, 58c, and 58d are not necessarily required. If the projections 58a, 58b, 58c, and 58d are not provided, the water to be treated 4 flowing as the lower side water film 56 runs down a left sidewall 16a and a right sidewall 16c of the treatment tank.

Ninth Embodiment

Figure 16:
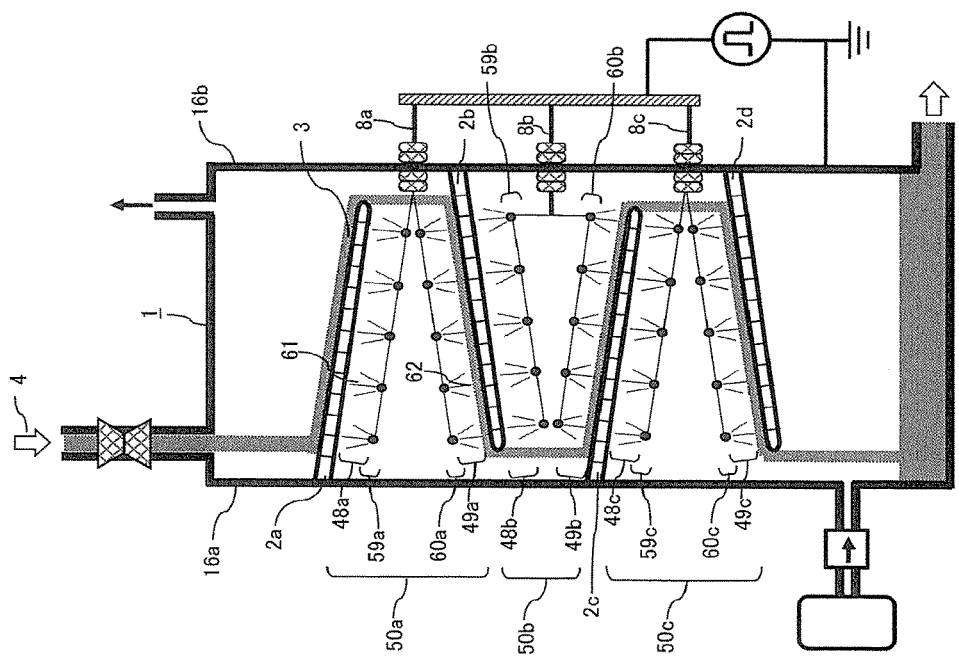
FIG. 16 is a cross-sectional view of a water treatment apparatus according to a ninth embodiment of the present invention.

FIG. 16 is a cross-sectional view of a water treatment apparatus according to a ninth embodiment of the present invention. In the ninth embodiment, a configuration of discharge electrodes differs from that of the sixth embodiment. In FIG. 16, ground electrodes 2a, 2b, 2c, and 2d are arranged sequentially in a vertical direction in an interior of a treatment tank 1. The ground electrodes 2a, 2b, 2c, and 2d have a flat plate shape and are disposed at an incline with respect to a horizontal plane.

Two of the ground electrodes arranged consecutively in a vertical direction are disposed such that a predetermined interval is formed therebetween in the vertical direction and so as to be bilaterally symmetrical with respect to a plumb plane. That is to say, in FIG. 16, a left side end portion of the ground electrode 2a is connected to a left sidewall 16a of the treatment tank 1, and a right side end portion thereof is held so as to be lower than the left side end portion.

Further, The right side end portion of the ground electrode 2b is connected to a right sidewall 16b of the treatment tank 1, and a left side end portion thereof is held so as to be lower than the right side end portion. The same applies to the ground electrodes 2c and 2d therebelow.

As a result, a gap 50a is formed between the ground electrodes 2a and 2b, a gap 50b is formed between the ground electrodes 2b and 2c, and a gap 50c is formed between the ground electrodes 2c and 2d. The water to be treated 4 supplied from the water supply port 1a flows downward in a zigzag along respective upper surfaces of the ground electrodes 2a, 2b, 2c, and 2d.

An upper discharge electrode 59a and a lower discharge electrode 60a are provided in the gap 50a. The upper discharge electrode 59a is constituted by a plurality (five in FIG. 16) of wire electrodes and arranged so as to elongate in a depth direction of the page on which FIG. 16 is depicted. In addition, the five upper discharge electrodes 59a are arranged so as to be held at equal distances from the lower surface of the ground electrode 2a via the upper gap 48a.

The lower discharge electrode 60a is constituted by a plurality (five in FIG. 16) of wire electrodes and arranged so as to elongate in a depth direction of the page on which FIG. 16 is depicted. In addition, the five lower discharge electrodes 60a are respectively arranged so as to be held at equal distances from the upper surface of the ground electrode 2b via the lower gap 49a.

Similarly therebelow, an upper discharge electrode 59b and a lower discharge electrode 60b are provided in the gap 50b between the ground electrodes 2b and 2c, and an upper discharge electrode 59c and a lower discharge electrode 60c are provided in the gap 50c between the ground electrodes 2c and 2d.

The upper discharge electrodes 59a and the lower discharge electrodes 60a are all connected to the wire 8a and, in the same way, the upper discharge electrodes 59b and the lower discharge electrodes 60b are connected to the wire 8b, and the upper discharge electrodes 59c and the lower discharge electrodes 60c are connected to the wire 8c. Other configurations are the same as those of the sixth embodiment.

By operating a pulse power supply (not shown) and applying a voltage to the upper discharge electrodes 59a, 59b, and 59c and the lower discharge electrodes 60a, 60b, and 60c, upper discharges 61 and lower discharges 62 are formed respectively in the upper gaps 48a, 48b, and 48c and the lower gaps 49a, 49b, and 49c. Other operations are the same as those of the sixth embodiment.

With the ninth embodiment, respective positions of the upper discharge electrodes 59a, 59b, and 59c and the lower discharge electrodes 60a, 60b, and 60c can be independently determined. For this reason, a degree of freedom in forming the gaps and discharge regions is improved.

Note that water treatment speed as described in this specification is defined as an amount of organic matter decomposed in the water to be treated 4 per unit of time. In addition, water treatment efficiency as described in this specification is defined as an amount of organic matter decomposed in the water to be treated 4 per unit of energy input.

The invention claimed is:

1. A water treatment apparatus comprising:
a plurality of ground electrodes arranged sequentially in a vertical direction in an interior of a treatment tank; and
a plurality of discharge electrodes, each provided in respective gaps formed between a lower surface of the ground electrode on an upper side and an upper surface of the ground electrode on a lower side of two of the ground electrodes arranged consecutively in the vertical direction, wherein
the plurality of ground electrodes are arranged such that upper surfaces of two of the ground electrodes arranged consecutively in the vertical direction are alternately inclined in opposite directions with respect to a horizontal plane,
a voltage is applied to each of the plurality of discharge electrodes such that a first discharge is formed in air between the lower surface of the ground electrode on the upper side and the discharge electrode, and a second discharge is formed in air between the upper surface of the ground electrode on the lower side and the discharge electrode, and
water to be treated that has been supplied from an upper part of the treatment tank is caused to continuously flow downward from the ground electrode of an uppermost part to the ground electrode of a lowermost part along the respective upper surfaces such that the water to be treated is treated.

2. The water treatment apparatus of claim 1, wherein
the gaps are formed uniformly between two of the ground electrodes arranged consecutively in the vertical direction in regions where the water to be treated flows downward.

3. The water treatment apparatus of claim 1, wherein
the gaps are constituted by:
lower gaps formed between the upper surfaces of the ground electrodes and the discharge electrodes; and
upper gaps formed between the lower surfaces of the ground electrodes and the discharge electrodes, and
the lower gaps and the upper gaps are formed so as to have respectively uniform heights.

4. The water treatment apparatus of claim 1, wherein
each of the plurality of ground electrodes has a triangular column shape.

5. The water treatment apparatus of claim 1, wherein
each of the plurality of ground electrodes has an isosceles triangular column shape.

6. The water treatment apparatus of claim 4, wherein
the water to be treated flows downward along the lower surfaces of the ground electrodes.

7. The water treatment apparatus of claim 1, wherein
a plurality of ground cartridges configured to include a ground electrode and a flange are provided,
the plurality of ground cartridges are inserted respectively into a plurality of openings formed along the vertical direction of an outer peripheral wall of the treatment tank and the flanges and the treatment tank are fastened to each other, such that the plurality of ground electrodes are formed in the interior of the treatment tank.

8. The water treatment apparatus of claim 1, wherein
the plurality of discharge electrodes are respectively held on the plurality of ground electrodes via an insulating member.

9. The water treatment apparatus of claim 1, wherein
each of the plurality of discharge electrodes is connected to an outer peripheral wall of the treatment tank via an insulating member.

10. The water treatment apparatus of claim 1, wherein
each of the plurality of discharge electrodes is supplied with electric power by wires that pass respectively through an interior of each of the plurality of ground electrodes.

11. The water treatment apparatus of claim 1, wherein
each of the plurality of ground electrodes has a hollow structure, in which penetrating holes are formed in an upper surface thereof, and a gas containing oxygen supplied into the hollow structure passes through the penetrating holes and is discharged into the treatment tank.

12. The water treatment apparatus of claim 1, wherein
each of the plurality of ground electrodes has a hollow structure, in which penetrating holes are formed in a lower surface thereof, and a gas containing oxygen supplied into the hollow structure passes through the penetrating holes and is discharged into the treatment tank.

13. The water treatment apparatus of claim 1, wherein
each of the plurality of ground electrodes has a flat plate shape, and
each of the plurality of discharge electrodes is a ribbon-shaped electrode, longitudinal surfaces thereof being arranged in the vertical direction.

14. A water treatment method to be applied to a water treatment apparatus including:
a plurality of ground electrodes arranged sequentially in a vertical direction in an interior of a treatment tank; and
a plurality of discharge electrodes, each provided in respective gaps formed between a lower surface of the ground electrode on an upper side and an upper surface of the ground electrode on a lower side of two of the ground electrodes arranged consecutively in the vertical direction,
the plurality of ground electrodes being arranged such that upper surfaces of two of the ground electrodes arranged consecutively in the vertical direction are alternately inclined in opposite directions with respect to a horizontal plane,
the water treatment method comprising:
a step in which a first discharge is formed in air between the lower surface of the ground electrode on the upper side and the discharge electrode by applying a voltage to each of the plurality of discharge electrodes,
a step in which a second discharge is formed in air between the upper surface of the ground electrode on the lower side and the discharge electrode by applying a voltage to each of the plurality of discharge electrodes, and
a step in which water to be treated is treated by causing the water to be treated that has been supplied from the upper part of the treatment tank to continuously flow downward from the ground electrode of an uppermost part to the ground electrode of a lowermost part along the respective upper surfaces, and pass through the gaps in which the first discharge and the second discharge are formed.

\* \* \* \* \*